Sept. 17, 1963　　K. G. A. PERSSON　　3,103,844
MICROTOME WITH ILLUMINATION AND OBSERVATION MEANS
Filed Sept. 28, 1959
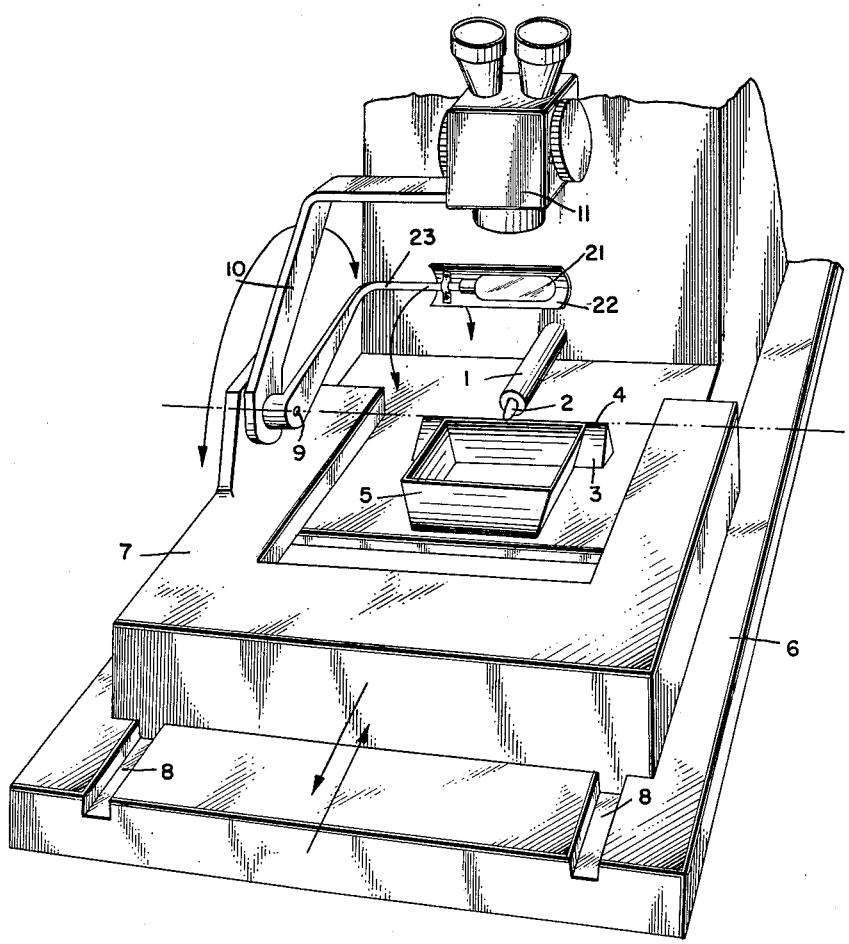
INVENTOR
KARL GORAN ALGY PERSSON
BY Pierce, Scheffler & Parker
　　　　his ATTORNEYS 3,103,844
MICROTOME WITH ILLUMINATION AND
OBSERVATION MEANS
Karl Göran Algy Persson, Stockholm, Sweden, assignor to
LKB-Produkter Fabrisaktiebolag, Mariehall, Sweden,
a company of Sweden
Filed Sept. 28, 1959, Ser. No. 842,681
Claims priority, application Sweden Oct. 1, 1958
1 Claim. (Cl. 83—167)

It is frequently desired, especially in the case of microscopes arranged for top illumination of the object, that is when the light falls onto the surface to be observed, to observe the object from different visual angles. This problem has been solved in the past by turning the object into the desired angle relative to the microscope. In the case of certain objects, however, this possibility cannot be resorted to, for instance in the case of objects floating on a liquid surface. Now, it is the purpose of the present invention to provide an observation device which permits the visual angle to be changed without moving the object to be observed. It is a further purpose of the invention to provide an observation device which permits the angle of the light falling onto the object to be changed without moving the object.

These desired purposes are met by the device according to the present invention, which is characterized by the fact that it contains a microscope which is arranged to be movable around the object to be observed.

The device according to the invention preferably contains an illuminating device, such as an incandescent lamp. Said lamp may be arranged stationary on the base of the apparatus, or it may be secured to the microscope so as to form a unit with the microscope. However, according to a preferred embodiment, the lamp is arranged to be movable around the object to be observed, independently of the movement of the microscope.

The microscope, and also the illuminating lamp, may be arranged to be movable around the object in any desired way, for instance by means of some guideways. According to a preferred embodiment the microscope, and also the lamp, are arranged to be rotatable around a pin or shaft. In this case, the axis of rotation is preferably to extend through the object to be observed, or close to said object, so that the distance from the object to the microscope, and the distance from the object to the lamp, will be constant.

One field of application for which the microscope according to the invention is particularly suitable, it its use an an observation instrument for microtomes. In the case of microtomes it is desired that the operator shall be able to observe the actual cutting region comprising the specimen to be sectioned, the knife edge and the sections cut, as well as to vary the visual angle in a simple way and without undertaking time-consuming readjustments of the microscope. An observation of the specimen, for example, may call for one visual angle, while an observation of the cutting edge may call for another visual angle, and an observation of the sections cut may call for a third visual angle. These desiderata are fulfilled according to the invention by the fact that the microscope with its illumination device is so arranged as to be angularly movable about an axis of rotation passing substantially through that portion of the cutting edge of the microtome knife which is used for sectioning. It is suitable then for the axis of rotation to extend substantially parallel to the cutting edge, preferably to coincide with the cutting edge. In the last-mentioned case it is possible, by arranging the microscope to be displaceable parallel with the axis of rotation, to direct the microscope quickly onto that portion of the cutting edge which one wants to use in the sectioning operation.

The invention will be explained more closely hereinafter with reference to the accompanying drawing.

The portion of the microtome shown in the FIGURE comprises a specimen holder 1 carrying a specimen block 2, a knife 3 with its cutting edge 4, and a cup 5 for collecting the sections cut on a liquid surface. Arranged on a base 6 is a support 7 which is movable, as indicated by the arrows, in a horizontal direction on the base by means of two guideways 8. The support is provided with a trunnion 9 to which one end of a first cranked arm 10 is rotatably mounted, as indicated by the arrows. The trunnion 9 is horizontal and so positioned that its axis may be brought to coincide with the cutting edge 4. Fastened to the other end of the arm 10 is a microscope of a well-known kind, shown here to be a binocular microscope 11 having one single objective. The microscope is so adjusted that its focus is situated at or near the actual cutting spot of the knife edge 4. Thus the field of vision will comprise the extreme end of the specimen block 2, a portion of the cutting edge 4, and that portion of the collecting cup 5 where the sections cut will land up.

If, with the microscope adjusted in this way, the arm 10 is turned about the trunnion 9, then the visual angle will be varied without changing the field of view. Nor will the distance between the operating spot of the cutting edge 4 and the microscope change. Thus it is possible to readjust the microscope quickly into any desired visual angle without the need of undertaking any other adjustment of the microscope.

If the operator desires to observe some other portion of the liquid surface in the cup 5, he simply moves the support in the guideways 8, and if necessary he may also move the microscope along the upper, horizontal portion of the arm 10.

The illustrated apparatus is provided with an illumination device in the form of a lamp 21 mounted, together with a reflector 22, on a second arm 23 which is angularly movable about the trunnion 9 as indicated by the arrows. The arm 23 is suitably shorter than the arm 10 so that the lamp can be rotated under the microscope. This enables the lamp to be rotated through approximately 180° whereby it is possible to obtain any desired angle of incidence of the on-falling light. It is even possible to swing the lamp so far down that it comes below the surface of the liquid in the cup 5. Thus, if the cup is made from a transparent material the light will penetrate through the sections from below. When using lamps emitting a diffuse light, it is not necessary for the axis of rotation of the lamp to extend through the object to be illuminated. When using an illumination device equipped with a collimator in order to emit a directed light, and especially if the directed light bundle illuminates only a small region surrounding the very cutting spot, it is of importance that the axis of rotation extends through the object so as to cause the latter to be illuminated in any position of the light source.

What is claimed is:

A microtome having a device for microscopically examining thin sections of an object cut by said microtome, comprising a support base, a first relatively longer supporting arm rotatably secured to a horizontally disposed trunnion mounted on said support base, a second relatively shorter supporting arm rotatably secured to a horizontally disposed trunnion mounted on said support base, said supporting arms having axes of rotation substantially horizontal, a microtome knife having a cutting edge, means for holding an object to be sectioned and microscopically examined and for moving such object past said cutting edge, said supporting arms and said microtome knife being in such relationship that the axes of said arms extend substantially through said cutting edge, a microscope secured on said first supporting arm, an illuminating device secured on said second supporting arm, said microscope and said illuminating device each being rotatable about said microtome knife edge completely independently of the other and so related as to be swingable each past the other, the invention being further characterized by the provision of a cup 5 for a body of liquid disposed adjacent to and beneath said microtome knife edge and in position to receive on a surface of such liquid body a section of such object dropping from said knife edge.

References Cited in the file of this patent

UNITED STATES PATENTS

| | | |
|---|---|---|
| 277,869 | Bausch | May 22, 1883 |
| 1,973,066 | Hauser et al. | Sept. 11, 1934 |
| 2,144,653 | Graff | Jan. 24, 1939 |
| 2,208,882 | Graff et al. | July 23, 1940 |
| 2,235,319 | Jobe | Mar. 18, 1941 |
| 2,380,267 | Ruth | July 10, 1945 |
| 2,563,473 | Levinson | Aug. 7, 1951 |
| 2,837,963 | Binstead et al. | June 10, 1958 |
| 2,857,808 | Hastings | Oct. 28, 1958 |
| 2,999,422 | Papritz | Sept. 12, 1961 |

FOREIGN PATENTS

| | | |
|---|---|---|
| 883,898 | France | Apr. 5, 1943 |